United States Patent

[11] 3,549,902

[72] Inventor LeRoy D. Barter
Fullerton, Calif.
[21] Appl. No. 692,751
[22] Filed Dec. 22, 1967
[45] Patented Dec. 22, 1970
[73] Assignee Beckman Instruments, Inc.
a corporation of California

[54] TWO TRANSISTOR BASE-TO-BASE DRIVEN SWITCH

4 Claims, 3 Drawing Figs.

[52] U.S. Cl. 307/243, 307/253, 307/254, 307/302
[51] Int. Cl. H03k 17/00
[50] Field of Search 307/240, 242, 243, 244, 241, 254, 302, 253

[56] References Cited
UNITED STATES PATENTS

| | | | |
|---|---|---|---|
| 2,892,103 | 6/1959 | Scarbrough | 307/247 |
| 2,962,603 | 11/1960 | Bright | 307/254 |
| 3,112,410 | 11/1963 | Schmid | 307/254X |
| 3,114,056 | 12/1963 | Berge | 307/302X |
| 3,235,753 | 2/1966 | Gaunt, Jr. | 307/254 |

*Primary Examiner*—Stanley D. Miller, Jr.
*Attorneys*—Robert J. Steinmeyer and Paul R. Harder

ABSTRACT: A transistor switching arrangement suitable for connecting a first terminal alternately to second and third terminals so that there is a time lapse between disconnecting one pair of terminals and connecting the other pair. Two transistors have their emitters interconnected and their base electrodes connected in a circuit loop that includes the switching voltage source. Forward current to one base-emitter diode can only flow when reverse current flows in the other base-emitter diode due to its Zener voltage being overcome by the switching voltage.

LEROY BARTER
INVENTOR.

BY T E Kristofferson
ATTORNEY

TWO TRANSISTOR BASE-TO-BASE DRIVEN SWITCH

BACKGROUND OF THE INVENTION

This invention relates to a transistor-switching arrangement and more particularly to such an arrangement for connecting one terminal alternately to two others in a break-before-make fashion in which the switching voltage is connected to send current in opposite directions through emitter-base junctions of two switching transistors.

Break-before-make operations of switches have been achieved in a number of ways. Mechanical contact arrangements have been used extensively in modulators and demodulators. They have the disadvantage of severe frequency limitations and the possibility of failure due to mechanical wear and contact abrasion.

Photosensitive resistors have also been widely used and arrangements incorporating these devices can perform a break-before-make function. Again, one of their main disadvantages is severe frequency limitation.

Various electronic circuits have also been utilized that usually involve a rather complex way of peak rectification to establish this mode of operation. A relatively close control of the driving waveform is necessary in order to achieve the type of operation that is brought about in a much simpler manner by the circuit of the invention.

SUMMARY OF THE INVENTION

Accordingly, it is an object of the invention to provide a simple circuit for alternately connecting one terminal to either one of two terminals in break-before-make sequence, which can be activated by a voltage waveform that may vary within wide limits, and with the circuit having no frequency limitations other than those imposed by the switching voltage source included therein.

The foregoing and other objects are achieved according to the invention by providing a circuit wherein the emitter-base junctions of two like conductivity type transistors are connected by joining their emitters and connecting a switching voltage source across their bases. The interconnected emitters form the one terminal and the collectors the other two terminals. Consequently, forward current to the base of one transistor which renders the emitter-collector path of that transistor conductive for signal current can only flow when reverse current can flow from the base electrode of the other transistor. The switching voltage which preferably is a sine or a trapezoidal wave causes conduction only after it exceeds the Zener voltage. During the transition there is a period wherein neither transistor conducts. It is not necessary that the voltage waveform that controls the switching be narrowly defined at every point as the operation of the device is based on the Zenering capability of planar type transistors. This can occur only when the voltage across a reversely biased emitter-base diode surpasses a given voltage, the Zener voltage. Zenering capability of these diodes is a common property of planar type transistors.

The novel features which are believed to be characteristic of the invention are set forth with particularity in the appended claims. The invention, and further objects and advantages thereof, can best be understood by reference to the following description and accompanying drawing.

DESCRIPTION OF PREFERRED EMBODIMENT

Figure 1:
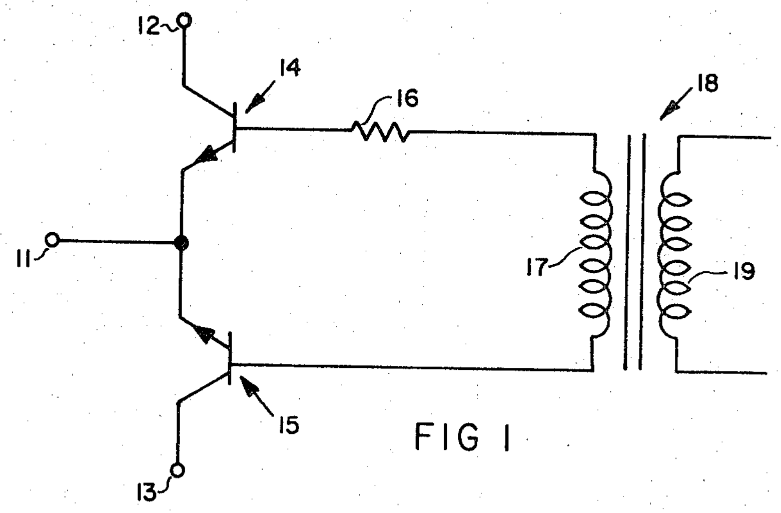
FIG. 1 shows a preferred embodiment of the circuit of the invention.

Referring now to FIG. 1 there is shown a terminal 11 which is to be connected in alternate periods of a repetitive cycle to terminals 12 and 13. A function of this nature may be required in a modulator or a demodulator. It is immaterial whether the signal flow is from terminal 11 to terminal 12 or 13 or from terminals 12 or 13 to terminal 11. It is also immaterial what the direction of current flow is. In other words, current may flow from terminal 11 to terminals 12 and 13 or the direction of current flow may be opposite thereto.

Terminal 11 is connected to the emitters of NPN transistors 14 and 15. The collectors of these transistors are connected to terminals 12 and 13 respectively. The base electrodes of transistors 14 and 15 are connected through a current-limiting resistor 16 in series with the secondary winding 17 of a transformer 18 which receives, upon its primary winding 19 a voltage having a sine or trapezoidal waveshape.

The operation of this circuit is similar to a break-before-make, single-pole-double-throw switch. When the base of transistor 14 is at a voltage that is positive with respect to that of its emitter, base current flows and current can flow in the emitter-collector path of transistor 14. Since the transistor is saturated current can then flow in either direction; that is, from terminal 11 to terminal 12 or vice versa. However, no forward base current will flow in transistor 14 unless the emitter-base diode of transistor 15 is conducting.

Figure 2:
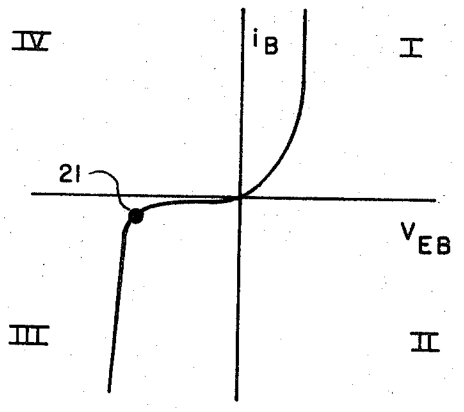
FIG. 2 is a graph showing the relationship between emitter base voltage and base current in a planar type transistor.

This will only happen under conditions that follow from the graph of FIG. 2, which shows the relationship in a transistor between $V_{EB}$, the base-emitter voltage, and the base current $i_B$. Forwardly biasing base-emitter voltages are shown to the right of the $i_B$ axis, reversely biasing voltages to the left side. In the conventional use of transistor switches only the first quadrant I of the characteristic curve of FIG. 2 is used. A forward bias, $V_{EB}$, of the emitter-base diode allows flow of base current which then allows flow of current from the emitter to the collector or vice versa. In the third quadrant III of the characteristic curve where the emitter-base diode is reversely biased, the base current remains essentially zero up to a point 21. If the reverse emitter-base diode voltage increases beyond that point, the reverse base current increases rapidly and the emitter-base diode becomes a very low impedance. The voltage at point 21 is called the Zener voltage. The behavior as described is common to planar transistors. Indeed, in conventional transistor circuits it is usually considered that the emitter-base path of a transistor is rendered nonconducting by reversely biasing the emitter-base diode, which is true, but only to a point.

Coming back to FIG. 1 it will be noted that a connection between terminals 11 and 12 will not be possible unless current flows in the reverse direction in the emitter-base diode of transistor 15.

Figure 3:
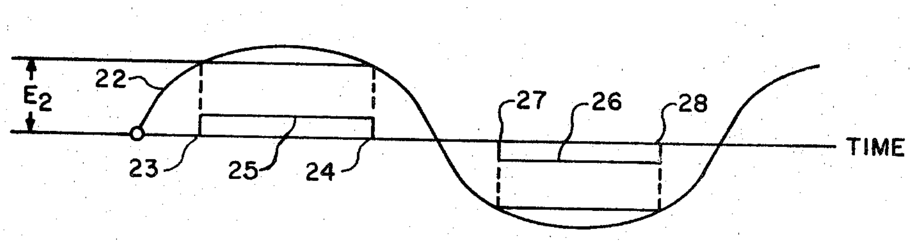
FIG. 3 illustrates the switching voltage impressed on the secondary of the transformer of FIG. 1.

FIG. 3 shows a sine wave 22 which may be impressed upon the secondary 17 of the transformer 18. At time 23 the voltage across the emitter-base diode of transistor 15 reaches a magnitude $E_2$ at which point forward base current begins to flow in transistor 14, and terminal 11 becomes connected to terminal 12. After time 24 the voltage 22 assumes a value below $E_2$ and conduction stops. The time period of conduction between terminals 11 and 12 is indicated by a horizontal line 25. In the period 24—27 neither one of the transistors 14 and 15 conducts. At time 27 the emitter-base diode voltage of transistor 14 breaks down allowing forward base current to flow in transistor 15 and thereby rendering the latter's collector-emitter path conductive so that terminals 11 and 13 are now interconnected. At point 28 the conduction between terminals 11 and 13 is discontinued because of the Zener voltage $E_2$ now becoming more than the voltage impressed upon winding 17. The time period of conduction between terminals 11 and 13 is indicated by line 26.

During the period such as 24—27 when the driving voltage undergoes its fastest change, when it otherwise would most likely interfere with the signal, there is no closed signal connection.

The operation is even more noise free when the driving voltage is of trapezoidal shape because then the driving voltage remains substantially constant during the time when either one of the signal paths (emitter-collector paths of transistors 14 and 15) is open. Obviously the peak to peak driving voltage should be more than the Zener voltage of either one of the emitter-base diodes. Such a trapezoidal wave shape may be provided by the circuit disclosed in the above-referenced copending application.

While a preferred embodiment of the invention has been shown and described, it will be obvious that numerous modifications may be made. For instance, PNP transistors may be substituted for the NPN transistors shown and the voltage source is, of course, not necessarily a transformer. The appended claims are intended to cover such modifications as well as the subject matter described and only to be limited by the true spirit of the invention.

I claim:

1. A switching circuit for connecting a first terminal alternately to a second and a third terminal comprising:

at least two transistors of like conductivity type each having emitter, base and collector electrodes, the emitter electrodes being connected together and to the first terminal, one collector electrode being connected to the second terminal and the other collector electrode being connected to the third terminal; and a switching voltage source connected between the base electrodes of said two transistors for alternately forward biasing the base-emitter junction of one transistor through the reverse breakdown voltage of the base-emitter junction of the other transistor whereby said one transistor is rendered conductive and said other transistor is rendered nonconductive between the emitter and collector electrodes thereof respectively.

2. A switching arrangement as defined in claim 1 wherein the switching voltage source comprises the secondary winding of a transformer.

3. The switching arrangement of claim 2 in which a current limiting resistor is connected in series with the secondary winding.

4. A single-pole-double-throw switching circuit of the type having break-before-make switching characteristics;

a pair of transistors of like conductivity type each having emitter, base and collector electrodes, the emitter electrodes being connected together to form the single pole of the switching circuit which is alternately connected through one of said transistor pair to a corresponding collector electrode, said pair of transistors having base-emitter junctions characterized by reverse Zener breakdown voltages of substantially equal value; and a transformer having a primary winding and a secondary winding, said primary winding having two terminals between which an alternating potential is impressed, said secondary winding having two terminals connected respectively to the base electrodes of said pair of transistors for impressing between said base electrodes an alternating potential and a bias current flow, the bias current alternately flowing through the forward biased base-emitter junction of one of said transistor pair and the reverse Zener breakdown voltage of the base-emitter junction of the other of said transistor pair thereby rendering said one of said pair of transistor conductive and said other of said pair of transistors nonconductive.